US006352240B1

(12) United States Patent
Eckstein et al.

(10) Patent No.: US 6,352,240 B1
(45) Date of Patent: Mar. 5, 2002

(54) HYDRAULIC CONTROL APPARATUS FOR A HOSPITAL BED

(75) Inventors: Gerald D. Eckstein, Batesville; David W. Hornbach, Brookville, both of IN (US); Jeffrey A. Moster, Cincinnati, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/311,466

(22) Filed: May 13, 1999

(51) Int. Cl.[7] .............................................. F16K 31/11

(52) U.S. Cl. ............... 251/129.03; 251/114; 251/129.2; 251/295; 5/615; 137/636.1

(58) Field of Search ........................... 251/129.03, 295, 251/129.19, 129.2, 114; 137/636, 636.1, 636.2

(56) References Cited

U.S. PATENT DOCUMENTS 2,051,938 A * 8/1936 Carlson .............. 251/129.2 X
2,687,536 A 8/1954 Miller
3,393,004 A 7/1968 Williams
3,603,559 A * 9/1971 Totten ..................... 251/129.2
3,724,003 A 4/1973 Ellwanger et al.
3,814,414 A 6/1974 Chapa
3,902,204 A 9/1975 Lee
3,993,051 A 11/1976 Maruyama
4,078,269 A 3/1978 Weipert
4,342,335 A * 8/1982 Reinicker et al. ........ 137/636.2
4,422,619 A * 12/1983 Griffiths ................ 251/129.03
4,427,176 A * 1/1984 Livet ................. 251/129.03 X
4,461,320 A * 7/1984 Barbagli .............. 137/636.2 X
4,751,754 A 6/1988 Bailey et al.
4,827,982 A * 5/1989 Inagaki .................... 137/636.1
4,912,787 A 4/1990 Bradcovich
5,054,141 A 10/1991 Foster et al.
5,063,624 A 11/1991 Smith et al.
5,074,000 A 12/1991 Soltani et al.
5,444,880 A 8/1995 Weismiller et al.
5,487,493 A * 1/1996 McNabb ................... 251/90 X
5,507,317 A * 4/1996 Yonekubo et al. .. 251/129.03 X
5,529,281 A * 6/1996 Brudnicki et al. ..... 251/129.03
5,566,716 A * 10/1996 Togashi et al. ......... 251/295 X
5,857,492 A * 1/1999 Salamun .................. 137/636.1
5,967,186 A * 10/1999 Grueninger ........ 251/129.03 X

* cited by examiner

*Primary Examiner*—Joseph A. Kaufman
*Assistant Examiner*—Eric Keasel
(74) *Attorney, Agent, or Firm*—Bose McKinney & Evans LLP

(57) ABSTRACT

A manifold and valve assembly includes a manifold block having an inlet, an outlet, and a conduit in fluid communication with the inlet and with the outlet. The assembly also includes a valve having a portion movable within the conduit between a first position blocking fluid communication between the inlet and the outlet and a second position in which the inlet is in fluid communication with the outlet, a solenoid operable to move the valve from the first position to the second position in response to an electrical input applied to the solenoid, and a lever operable to move the valve from the first position to the second position in response to a manual input applied to the lever.

13 Claims, 9 Drawing Sheets

HYDRAULIC CONTROL APPARATUS FOR A HOSPITAL BED

BACKGROUND AND SUMMARY OF THE INVENTION

This invention relates to hydraulic controls for articulating and raising hospital beds and more particularly to a hydraulic control apparatus which uses solenoid valves and an electric pump which can be overridden by manual controls and a manual pump.

It is well known for patient support devices such as hospital beds and stretchers to be provided with hydraulic systems which allow the caregiver to raise the height of the bed and articulate a deck underlying the patient support surface to modify the configuration of the patient support surface. When such beds were originally conceived, the control valves and pumps associated with hydraulic cylinders were all manually operated. Manual operation of pumps and control valves can become fatiguing, therefore, articulatable and height adjustable beds were provided with electric motors and electrically controlled valves associated with the hydraulic cylinders. Combinations of electrically controlled pumps and valves and manually operated pumps and valves are also known. One problem with electrically controlled hydraulic cylinders is that during power outages the cylinder cannot be operated and the bed cannot be adjusted. Height adjustment and bed articulation facilitate appropriate treatment of patient injuries, and therefore, loss of the articulation and height adjustment is undesirable in a hospital environment.

Hospital beds with adjustable patient support surfaces moved by hydraulic cylinders which can be controlled either manually or electrically have been provided to address the need for bed adjustment in the event of a power outage. Smith et al., U.S. Pat. No. 5,063,624, discloses a manual/electric twin jack bed which provides for manual or electric control of valves and pumps for providing fluids to hydraulic cylinders which will adjust the height of the bed and allow the bed to be configured in Trendelenburg and Reverse Trendelenburg positions.

Bailey et al., U.S. Pat. No. 4,751,754, discloses a dual hydraulic hospital bed with emergency bypass circuit which provides manually actuated valves and electrically actuated valves for controlling hydraulic cylinders which raise, lower, and articulate a patient support platform. Both of these dually controlled hydraulic systems appear to use a different set of valves for manual operation and electrical operation of the hydraulic systems. Thus, the hydraulic controls could not easily be retrofitted to a bed previously having only a manual or only an electrically controlled hydraulic system.

Caregivers would appreciate a hydraulic control apparatus for a hospital bed that includes a hilow function and an articulating deck which can be operated manually, electrically, or through a combination of manual and electric operation using a single set of valves. Caregivers and healthcare facilities would appreciate a hydraulic control system allowing manual and electrical operation which could replace the controller on a bed which was operated with only manual controls or only with electrical controls.

According to the present invention a manifold and valve assembly includes a manifold block having an inlet, an outlet, and a conduit in fluid communication with the inlet and with the outlet, a valve having a portion movable within the conduit between a first position blocking fluid communication between the inlet and the outlet and a second position in which the inlet is in fluid communication with the outlet, a solenoid operable to move the valve from the first position to the second position in response to an electrical input applied to the solenoid, and a lever operable to move the valve from the first position to the second position in response to a manual input applied to the lever. The manifold and valve assembly may also include a lock engaging the lever to lock the lever in a position having the valve in the second position. The lock may include a lock solenoid and a lock bar coupled to the lock solenoid, wherein the lock bar engages the lever, and the lock solenoid is operable to move the lock bar in response to an electrical input to the lock solenoid. Often the lever is pivotally coupled to the manifold block and the solenoid is positioned to lie between the manifold block and the lever. The valve may include a stem a part of which is received in an opening in the lever.

According to the present invention a controller for a hospital bed having a bed frame and a support section arranged to receive a portion of a patient's body which is vertically movable with respect to the frame includes a fluid actuated cylinder attached between the support section and the bed frame, a supply of fluid, a fluid supply path providing fluid communication between the fluid supply and the fluid actuated cylinder, a manually operated pump in the fluid supply path, an electrically operated pump in the fluid supply path, a valve block having a solenoid operated supply valve with manual override in the fluid supply path and designed to selectively interrupt the fluid supply path, an electrical supply actuator connected to the solenoid of the supply valve and to the electrically operated pump to electrically control the interruption of fluid communication between the fluid actuated cylinder and the fluid supply, and a manual actuator connected to the manual override of the supply valve to manually control the interruption of fluid communication between the fluid actuated cylinder and the fluid supply. The controller may also include an electrically actuated manual setting remover coupled to the electrical actuator so that the manual setting is removed upon electrical actuation of the solenoid of the valve. The controller may include a fluid return path providing fluid communication between the fluid supply and the fluid actuated cylinder, a solenoid operated return valve with manual override to selectively interrupt fluid communication between the fluid actuated cylinder and the fluid return path, and an electrical control including the electrical supply actuator and an electrical return actuator connected to the solenoid of the return valve to electrically control the interruption of fluid return path arranged so that the manual supply actuator is also connected to the manual override of the return valve to manually control the interruption of fluid return path.

A valve block in accordance with the present invention includes a fluid supply path, a fluid return path, a valve assembly having a supply member and a return member, a multi-state manual actuator operably connected to the supply member and the return member, an electrical actuator operably connected to the supply member and to the return member, a controller for generating an override signal when the electrically operated actuator is actuated, and a manual actuator override. The supply member of the valve assembly is positionable between a supply interruption position in which the supply member interrupts the fluid supply path and a supply position in which the supply member does not interrupt the fluid supply path while the return member is positionable between a return interruption position in which the return member interrupts the fluid return path and a return position in which the return member does not interrupt the fluid return path. The multi-state manual actuator is designed and arranged to assume a supply state in which the supply member is in the supply position and the return member is in the return interruption position, a return state in which the return member is in the return position and the supply member is in the supply interruption position, and a neutral state wherein the supply member and the return member are free to assume any position. The electrical actuator selectively positions the supply member between the supply interruption position and the supply position and also selectively positions the return member between the return interruption position and the return position. The manual actuator override is designed and arranged to place the multi-state manual actuator in the neutral state when an override signal is generated.

The valve assembly may include a supply valve and a spaced apart return valve. The supply member may include a supply-opened engagement point and the return member may include a return-opened engagement point and the multi-state manual actuator may include an arm which engages the supply-opened engagement point and does not engage the return-opened engagement point when the multi-state manual actuator is in the supply state, engages the return-opened engagement point and does not engage the supply-opened engagement point when the multi-state manual actuator is in the return state, and does not engage either the supply-opened or return-opened engagement points when in the neutral position. The multi-state manual actuator may include a spring element biasing it in the neutral state, a supply state catch to lock it in the supply state, and a return state catch to lock it in the return state. The override may include a catch engager and a catch engager actuator to position the catch engager between a catch-engaged state in which it engages either the supply catch or the return catch and a catch-disengaged state. The catch engager actuator may include an arm biased to engage either the supply catch or the return catch and a solenoid electromagnetically coupled to the arm to disengage the arm from the supply catch or the return catch when the solenoid is energized. The interrupt signal may cause the solenoid to be energized. The valve assembly may include a supply valve and a spaced apart return valve. The valve block may also include a housing having a mounting surface, and a fulcrum having a first side and a second side mounted to the mounting surface, wherein the arm is pivotally mounted to the fulcrum and the supply valve is mounted to the mounting surface on the first side of the fulcrum and the return valve is mounted to the mounting surface on the second side of the fulcrum.

A control for a hospital bed having a bed frame, a first support section arranged to receive a first portion of a patient's body and being vertically movable with respect to the frame, and a second support section arranged to support a second portion of a patient's body in accordance with the present invention includes a first fluid actuated cylinder attached between the first support section and the bed frame, a second fluid actuated cylinder attached between the second support section and the bed frame, a supply of fluid, a fluid return path, fluid supply path, a manually operated pump, an electrically operated pump, a valve block including a first valve assembly and a second valve assembly, and a valve controller connected to the first valve assembly and the second valve assembly. The return fluid path provides fluid communication between the fluid supply and the cylinders while the fluid supply path provides fluid communication between the fluid supply and the cylinders. Both the manually operated pump and the electrically operated pump are in fluid communication with the fluid supply path. The first valve assembly is in fluid communication with the first fluid actuated cylinder, the fluid supply path, and the fluid return path. The first valve assembly is designed to selectively interrupt fluid communication between the first fluid actuated cylinder and the fluid supply path and to selectively interrupt fluid communication between the first fluid actuated cylinder and the fluid return path. The second valve assembly is in fluid communication with the second fluid actuated cylinder, the fluid supply path, and the fluid return path. The second valve assembly is designed to selectively interrupt fluid communication between the second fluid actuated cylinder and the fluid supply path and to selectively interrupt fluid communication between the second fluid actuated cylinder and the fluid return path. The valve controller controls the interruption of fluid communication between the first fluid actuated cylinder and the fluid supply path, the first fluid actuated cylinder and the fluid return path, the second fluid actuated cylinder and the fluid supply path, and the second fluid actuated cylinder and the fluid return path. The valve controller is designed to prohibit the first valve assembly from assuming a state in which fluid communication is simultaneously not interrupted between the first fluid actuated cylinder and the fluid return path and the first actuated cylinder and the fluid supply path and to prohibit the second valve assembly from assuming a state in which fluid communication is simultaneously not interrupted between the second fluid actuated cylinder and the fluid return path and the second actuated cylinder and the fluid supply path.

Additional objects, features, and advantages of the invention will become apparent to those skilled in the art upon consideration of the following detailed description of the illustrated embodiment exemplifying the best mode of carrying out the invention as presently perceived.

DETAILED DESCRIPTION OF A PREFERRED EMBODIMENT OF THE INVENTION

Figure 1:
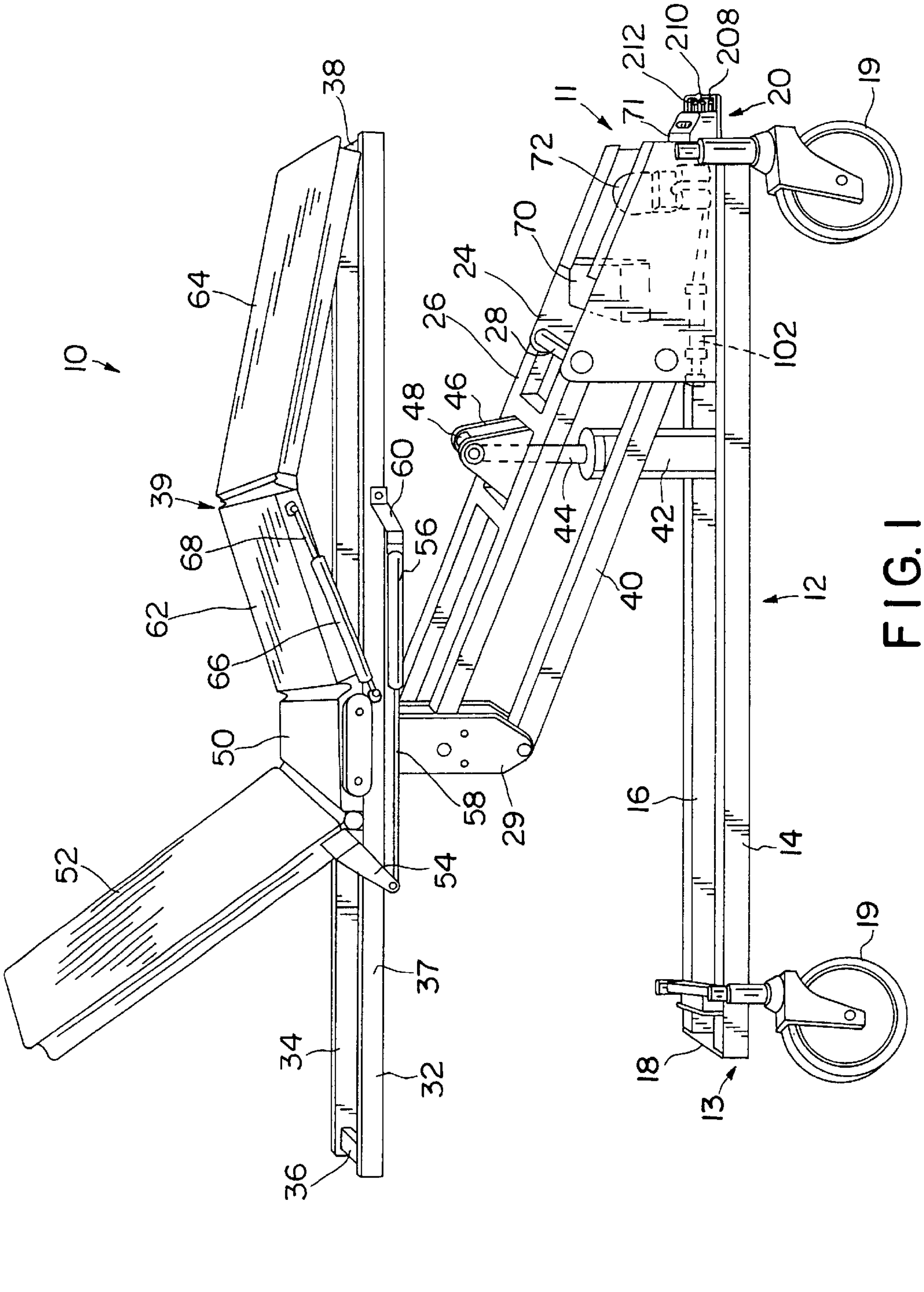
FIG. 1 is a perspective view of a hospital bed of the present invention with most of its cover plates removed showing the hydraulic control apparatus extending from the base at the foot of the bed on the right side of the drawing.

FIG. 1 illustrates a hospital bed, generally designated by the numeral 10, of the type which is sold by the Hill-Rom Company, Inc. under the designation of Century CC hospital bed modified to include the hydraulic control apparatus 20 of the present invention. Bed 10 illustrated in FIG. 1 is shown with most of the cosmetic moldings and enclosures which normally surround it removed. This is done in order to better see the hydraulic system 30 controlled by the present invention.

Bed 10 includes a base frame 12 which is made up of longitudinal members 14 and 16 which are tied together by a pair of transverse members only one of which, 18, is visible in FIG. 1. Attached to base frame 12 are four large casters designated as 19. Only two of these casters 19 are visible in FIG. 1, but it may be appreciated that the two opposing casters are on the opposite side and serve to support base frame 12 in a mobile fashion.

Figure 3:
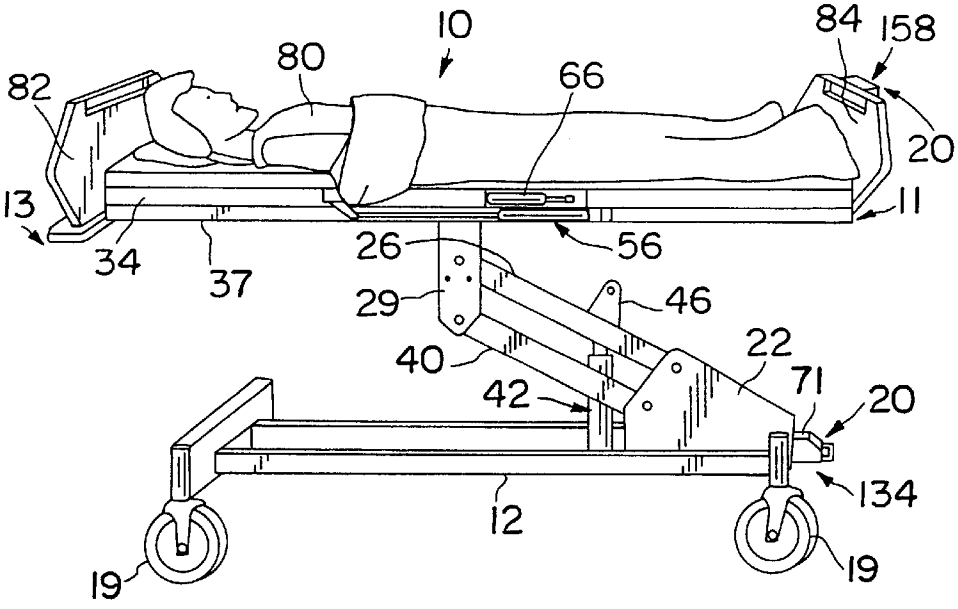
FIG. 3 is a view similar to FIG. 2 showing the patient returned to a supine position.
Figure 2:
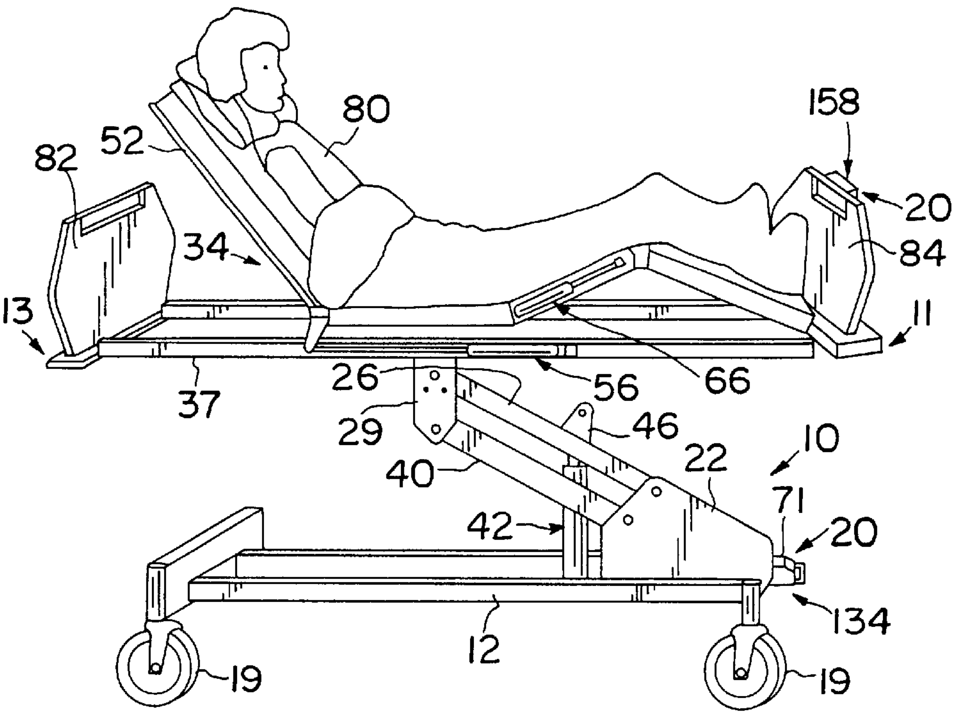
FIG. 2 is a perspective view of the hospital bed of the present invention showing a patient in an elevated position.
Figure 4:
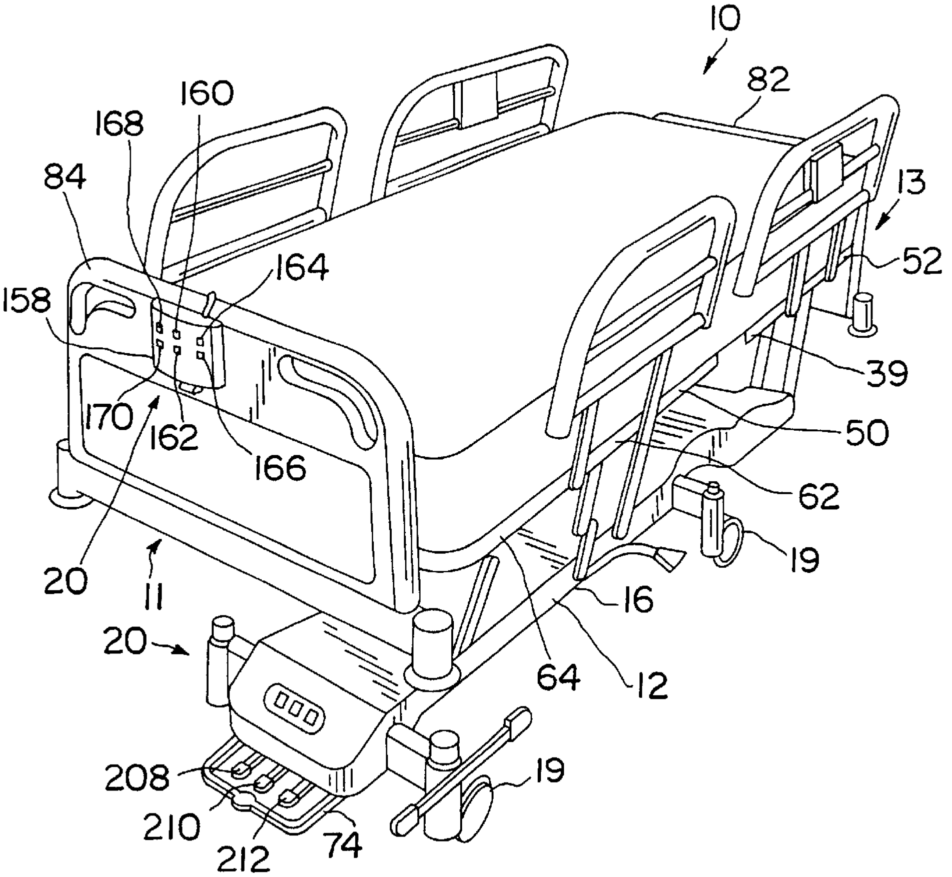
FIG. 4 is a perspective view of a hospital bed including the hydraulic control apparatus of the present invention with cosmetic moldings and enclosures attached to the bed showing a control panel attached to the foot board, three pedal ends of manual selector levers of a hydraulic controller extending from a cover at the foot of the bed, and a pump bar for actuating a manual pump extending from the same cover.
Figure 6:
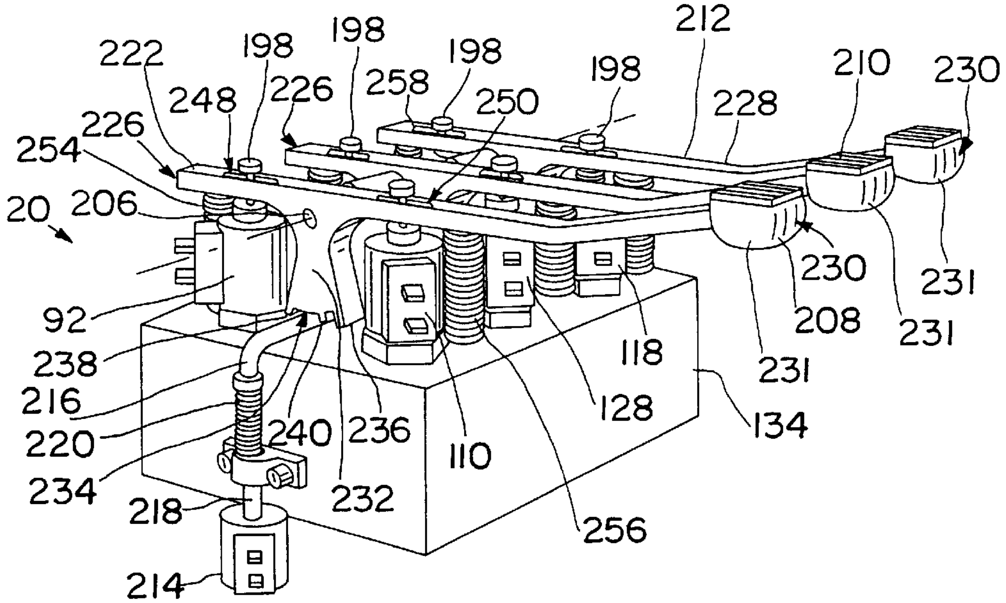
FIG. 6 is a perspective view of a valve housing of the hydraulic controller of the present invention showing solenoid operated valves with manual overrides which are actuated either electrically or manually, and showing manual selector lever arms pivotally mounted to the valve housing with two shafts of the manual overrides extending through slots in each arm.

A valve housing 134 of the hydraulic controller 20 in accordance with the present invention is attached to foot end 11 of base frame 12 of bed 10 as shown, for example, in FIGS. 1–4. Hereinafter the term foot end 11 will be applied to various components of bed 10 and of bed 10 itself to designate the end of the component or bed toward which a patient's feet are normally directed. The term head end 13 will be used in a similar fashion. FIGS. 2–4 also show a control panel 158 attached to the footboard 84 of bed 10. While in illustrated embodiment hydraulic controller 20 is attached to foot end 11 of bed 10 for operation of the valve housing 134 by the foot of a caregiver, it is to be understood that hydraulic controller 20 may be attached in any convenient location to bed, and may even remain disconnected from bed 10. Valve housing 134 of hydraulic controller 20 also may be configured for operation by the hand or a combination of the hand and foot of the caregiver within the scope of the present invention. Hydraulic controller 20 is only one component of the hydraulic system 30 of bed 10. The remaining lines, valves, cylinders and other components of hydraulic system 30 will be described hereafter.

Returning to FIG. 1, there is shown two generally triangular, vertically extending bosses 22 and 24 attached to the foot end 11 of bed 10. Bosses 22 and 24 serve as a pivot mounting for a cantilevered support arm 26. Cantilevered support arm 26 is hingedly attached to bosses 22 and 24 through a pivot pin 28. Cantilevered arm 26 is attached at its end remote from pivot pin 28 to two brackets 29, only one of which is visible in FIG. 1. Bracket 29 and its corresponding bracket on the opposite side, which is not visible in this view, are attached to two longitudinal frame members 32 and 34. Frame members 32 and 34 are then tied together by transverse members 36 and 38 to form a rigid intermediate frame 37 that will move with brackets 29.

Also attached to bracket 29 is a stabilizing arm 40 which is pivoted to boss 22. Stabilizing arm 40 moves with cantilevered arm 26 to provide a stabilizing, function as cantilevered arm 26 moves. Cantilevered arm 26 is driven by a hydraulic cylinder 42 which has an extensible piston or rod 44 that is attached to a clevis mount 46 on cantilever arm 26. Clevis mount 46 has a pin 48 which connects clevis mount 46 to rod 44. The base of cylinder 42 is attached to members 14 and 16.

It may be appreciated that as rod 44 is extended and retracted its movement will in turn be transferred through clevis mount 46 and pin 48 to cantilevered arm 26. Extension and retraction of rod 44 will move cantilevered arm 26 up and down. The position shown in FIG. 1 is an essentially fully extended, or up, position for cantilevered arm 26. It may be appreciated that retraction of rod 44 will then cause cantilevered arm 26 to retract, bringing with it intermediate frame 37 attached to brackets 29. Since cylinder 42 controls the raising and lowering of the support surface of bed 10, commonly called the hilow function, cylinder 42 will be herein after referred to as hilow cylinder 42.

As is the case with many hospital beds, bed 10 includes an articulating deck 39 to achieve various configurations of the patient support surface. Articulating deck 39 is carried by longitudinal frame members 32 and 34. Articulating deck 39 is made up of several elements. There is a fixed seat element 50 which does not move. Adjacent to the head end 13 of bed 10 there is a head portion 52 on which a patient's upper body portion would normally rest and which may be articulated from a fully down position resting on frame numbers 32 and 34 as shown, for example, in FIGS. 3 and 4 to the fully up position, as shown, for example, in FIGS. 1 and 2. Head portion 52 is raised and lowered through a crank mechanism 54 that is actuated by a hydraulic head cylinder 56 having an extensible piston or rod 58 which is attached to and drives crank mechanism 54. Since cylinder 56 controls the articulation of head portion 52, it will hereinafter be referred to as head cylinder 56.

Head cylinder 56 is attached to longitudinal frame member 32 by a bracket 60. In FIG. 1, only one head cylinder 56 is visible to drive head portion 52. However, it is preferred that two head cylinders 56, 56' be used, one carried by frame member 32 and the other on the opposite side carried by frame member 34. Second head cylinder 56' is not visible in FIG. 1, but it is shown schematically in FIG. 5. The head elevation function would work with only one head cylinder 56, but two cylinders 56, 56' provide a smoother motion and less chance of binding of crank mechanism 54.

Two additional portions of articulating deck 39 are a thigh portion 62 and a leg portion 64. Thigh portion 62 and leg portion 64 are pinned together so that they move as a unit. Thigh portion 62 and leg portion 64 are also pinned to fixed seat portion 50 so that they may be elevated as shown in FIG. 1. Actuation of thigh portion 62 will cause corresponding raising of leg portion 64. Thigh portion 62 is raised and lowered by a hydraulic cylinder 66 having an extensible piston or rod 68 that is attached to thigh portion 62. Since cylinder 66 controls the articulation of leg portion 64, it will hereinafter be referred to as leg cylinder 66. Extension and retraction of rod 68 will cause corresponding movement of thigh portion 62 and leg portion 64.

None of the hydraulic piping or valves necessary for operation of this system 30 are shown in FIG. 1 to avoid unnecessary complication. FIG. 1 does show in phantom lines that a reservoir 70 for hydraulic fluid is carried between vertical bosses 22 and 24. Also carried between bosses 22 and 24 is a power pack 72 including an electric motor 76 and a pump 78 (see FIG. 5) for providing electrical pumping power for hydraulic system 30 and a manual pump 102.

Figure 5:
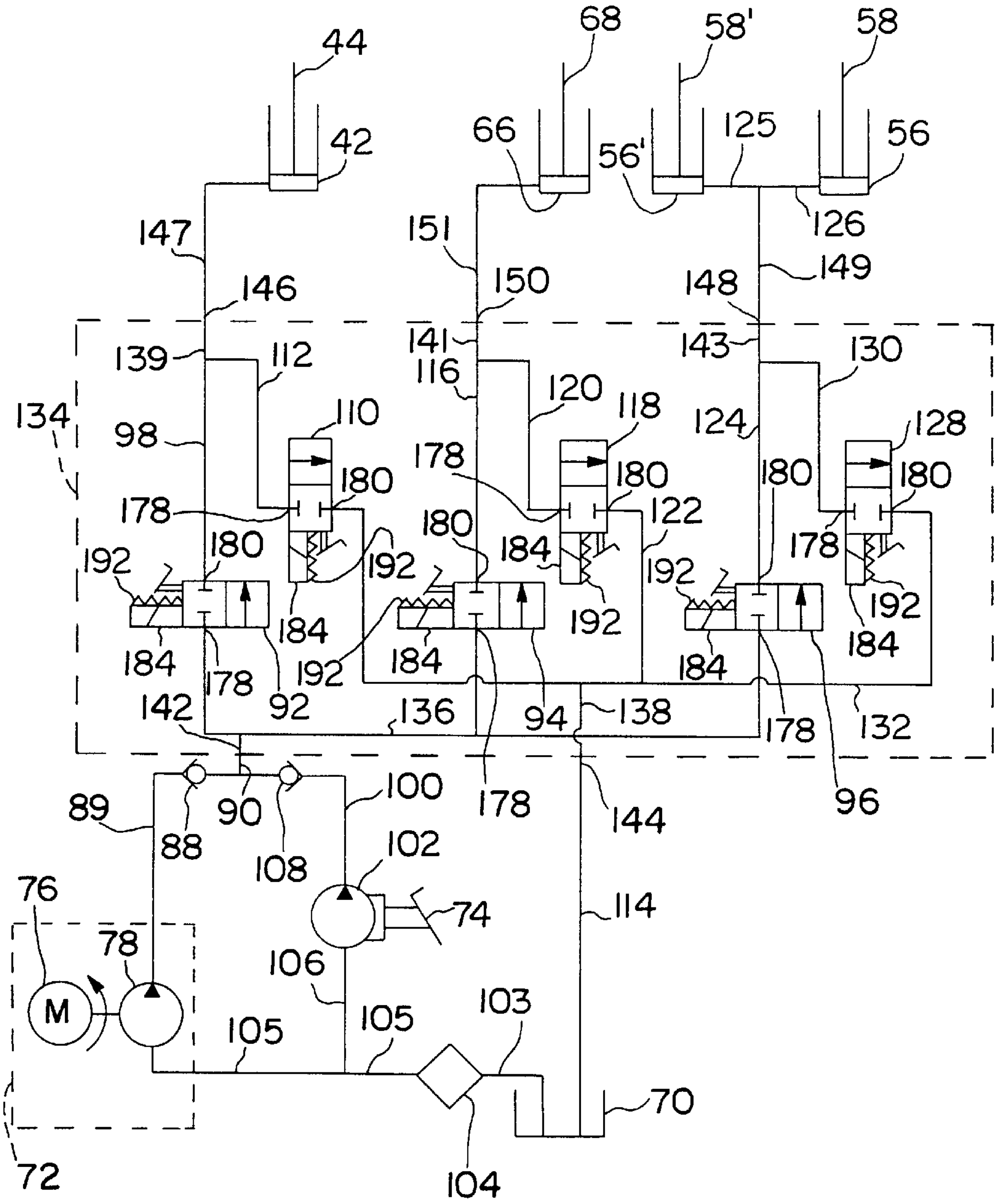
FIG. 5 is a schematic circuit diagram for the hydraulic system of the present invention.
Figure 8:
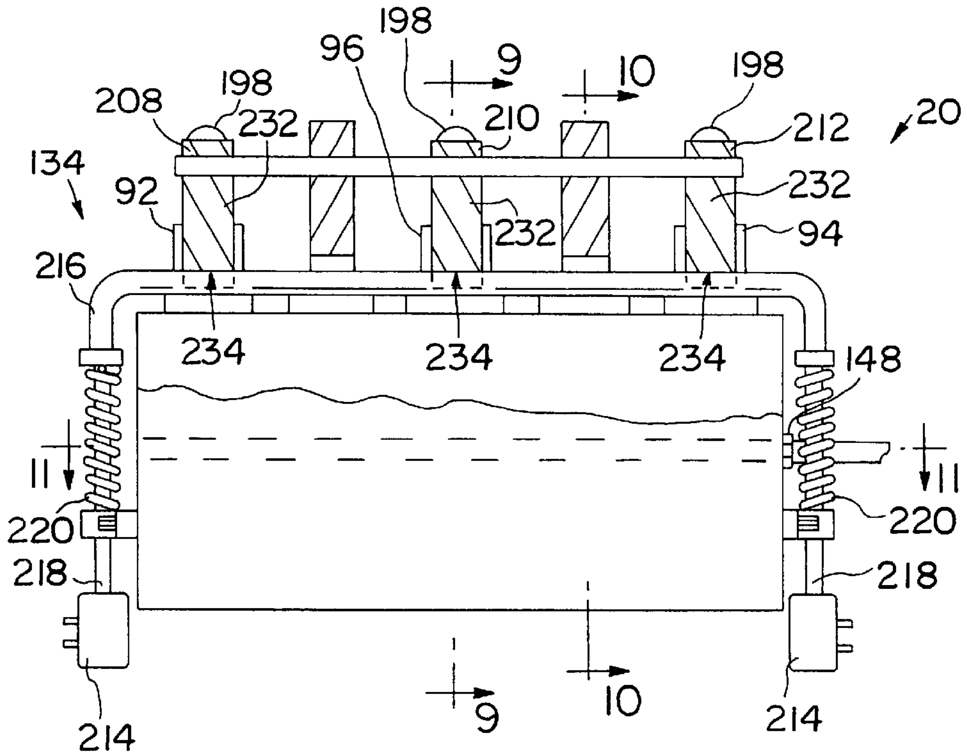
FIG. 8 is a sectional view of the hydraulic controller along line 8—8 of FIG. 7.
Figure 7:
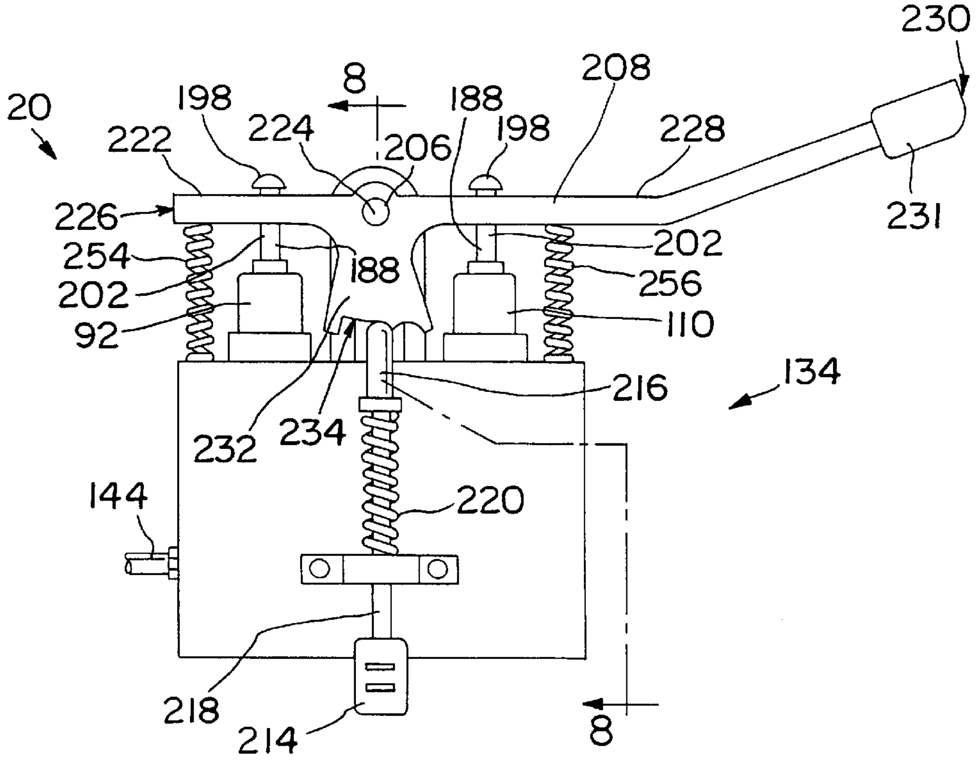
FIG. 7 is a side elevation view of the hydraulic controller of FIG. 6 showing a solenoid controlling a lock bar which can lock the lever arms in a depressed state and which when retracted by solenoid operation will allow the lever arms to return to a neutral position.
Figure 11:
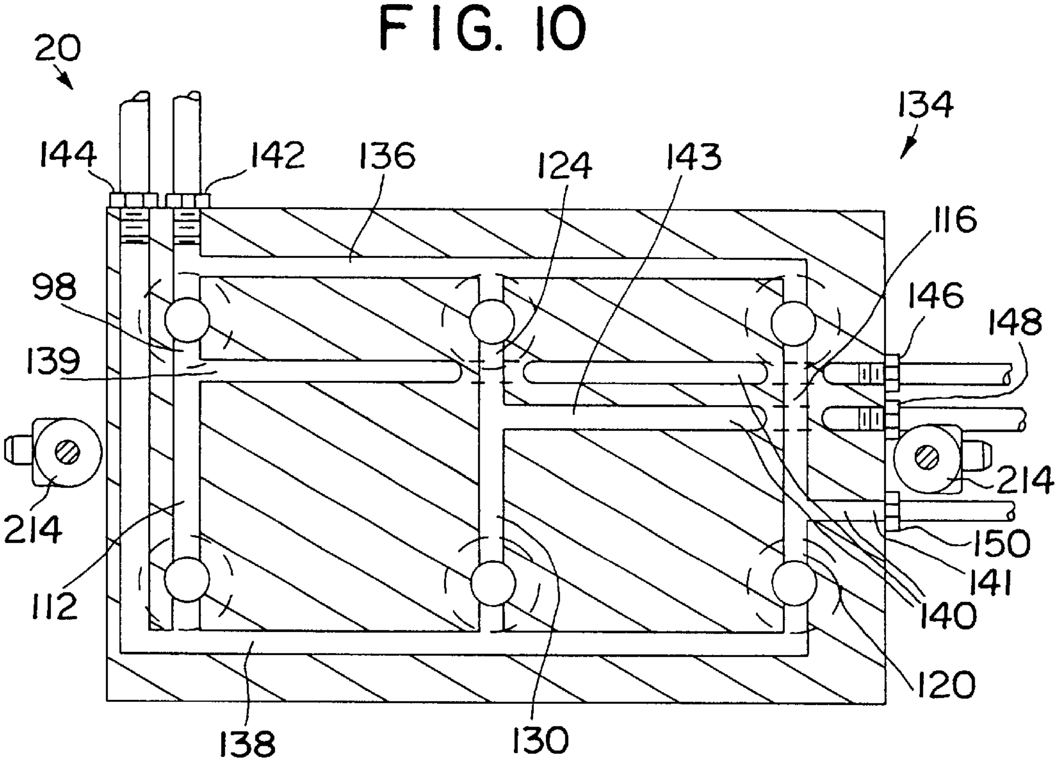
FIG. 11 is a sectional view taken along line 11—11 of FIG. 8 showing the pressure manifold, release manifold and distribution manifolds of the valve housing.
Figure 12:
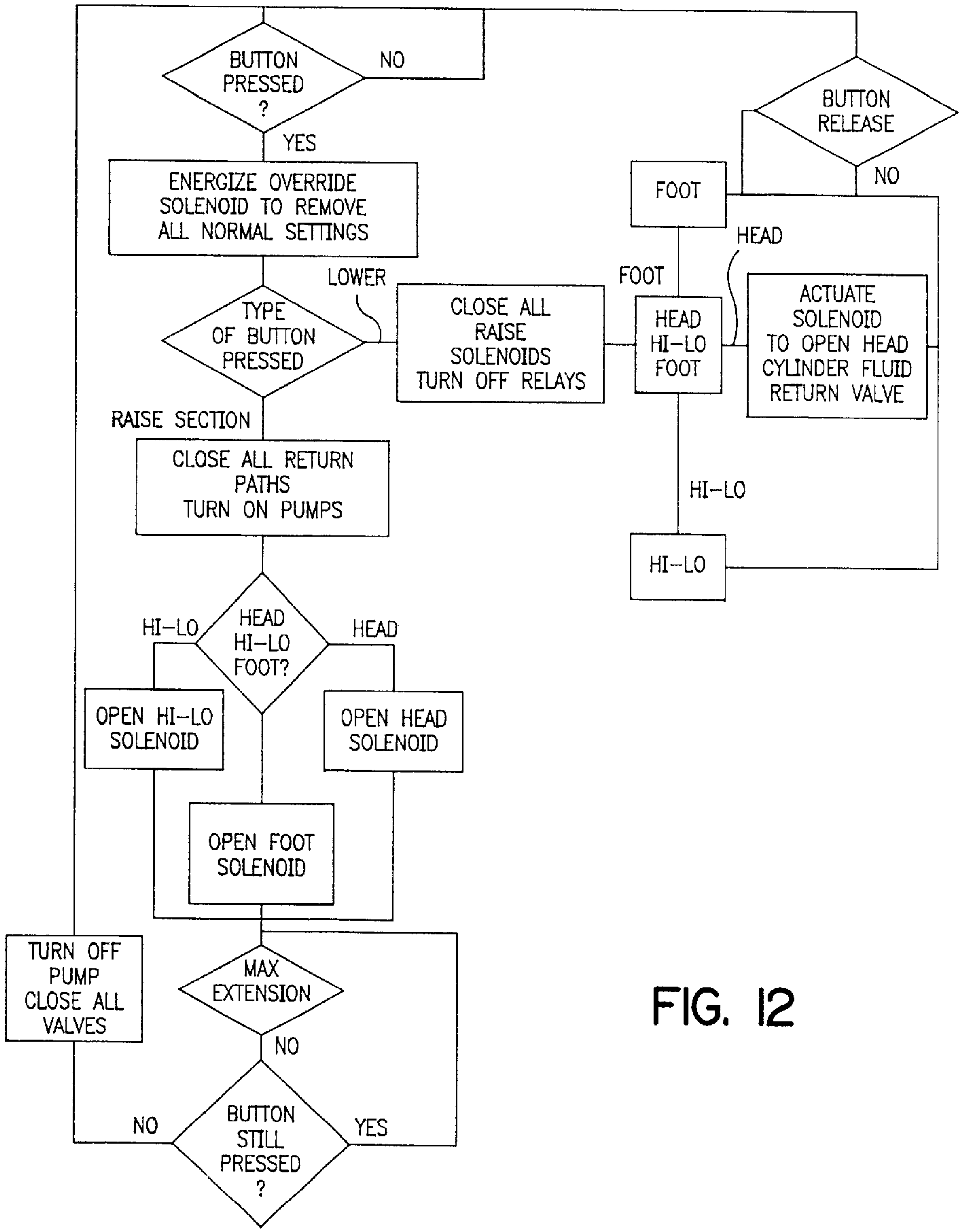
FIG. 12 is a flow chart of the operation of the hydraulic control apparatus in electrical mode.
Figure 13:
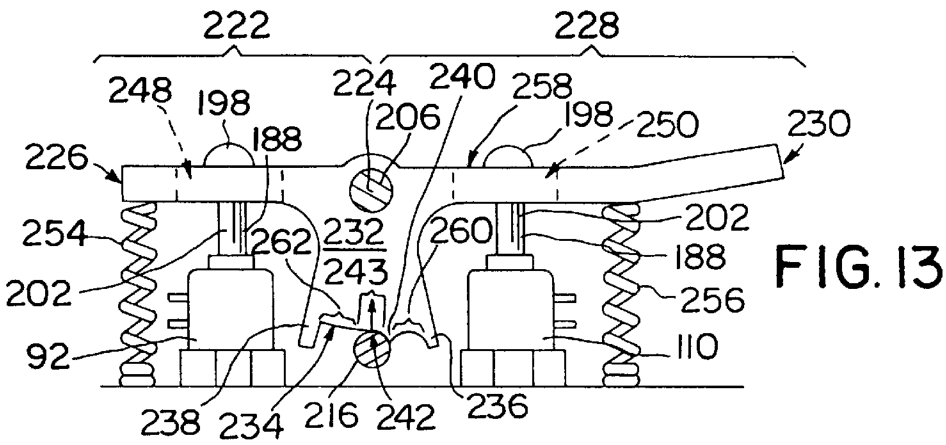
FIG. 13 is a view of one of the manual selector lever arms with an angled pedal end, its associated extender valve, its associated retraction valve and the lock bar of the present invention in a neutral position wherein both the extender valve and retraction valve are in their normally closed state and the lock bar abuts a cam formed on an arcuate surface extending from the arcuate surface.

As shown, for example, in FIGS. 5 and 11, hydraulic controller 20 includes a valve housing 134 having a pressure manifold 136, a return manifold 138, a distribution manifold 140, a pressure inlet 142, a return outlet 144, a hilow port 146, a head port 148, and a leg port 150. Hydraulic controller 20 also includes three solenoid controlled extension valves with manual overrides 92, 94, 96 extending through valve housing 134 to interrupt fluid flow between pressure manifold 136 and distribution manifold 140 and three solenoid controlled retraction valves with manual overrides 110, 128, and 118 extending through valve housing 134 to interrupt fluid flow between return manifold 138 and distribution manifold 140. Thus extension valve 92 and retraction valve 110 are associated with hilow cylinder 42, extension valve 96 and retraction valve 128 are associated with head cylinders 56, 56', and extension valve 94 and retraction valve 118 are associated with leg cylinder 66.

Figure 9:
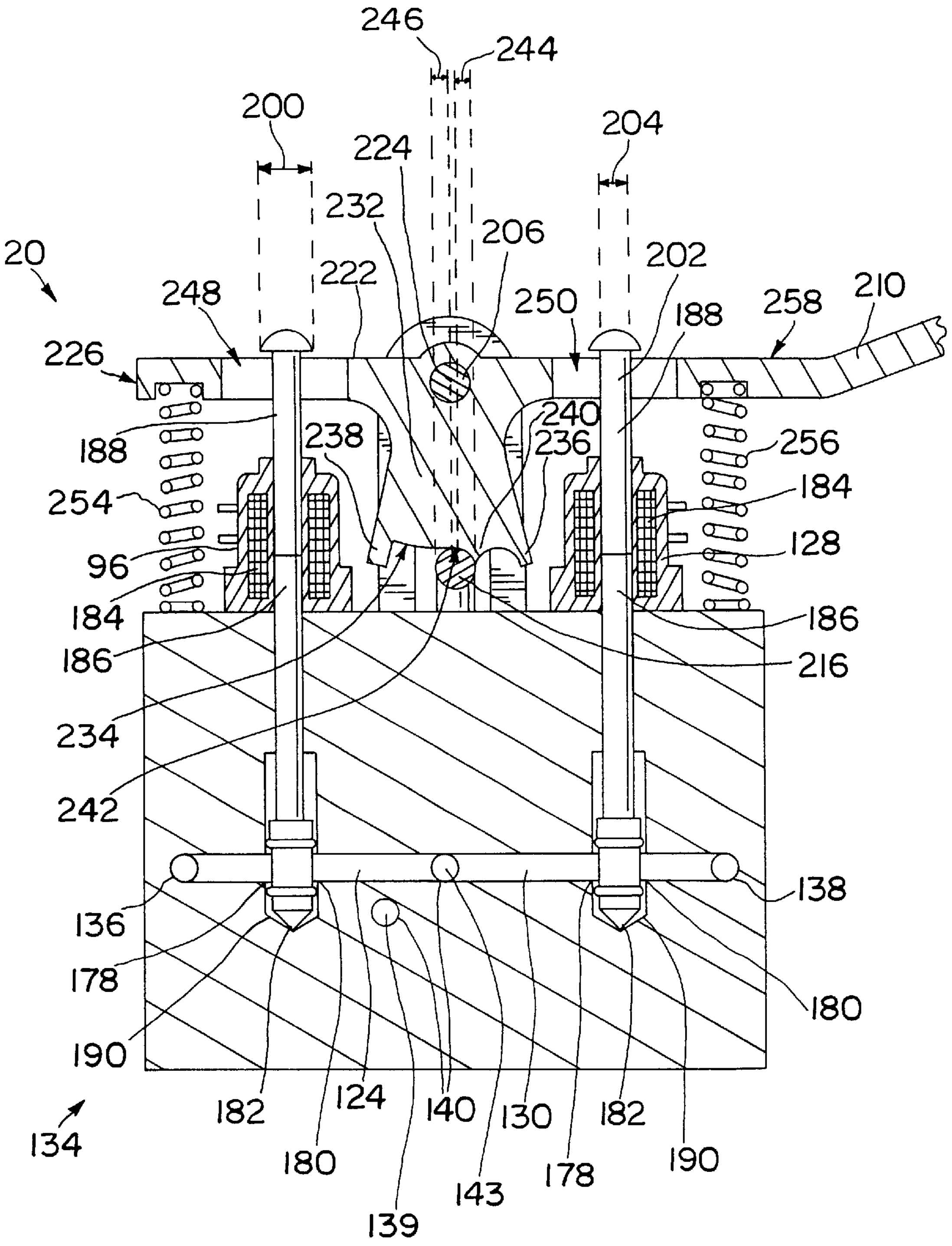
FIG. 9 is a sectional view of the hydraulic controller taken along line 9—9 of FIG. 8 showing the manual overrides of the solenoid operated valves received in slots in the lever arms so that rotation of the lever arm about pivot bar will actuate the manual overrides and showing plungers of the valves in their normally closed position engaging valve seats to interrupt fluid flow between the distribution manifold and a pressure manifold to the left and a return manifold to the right.
Figure 10:
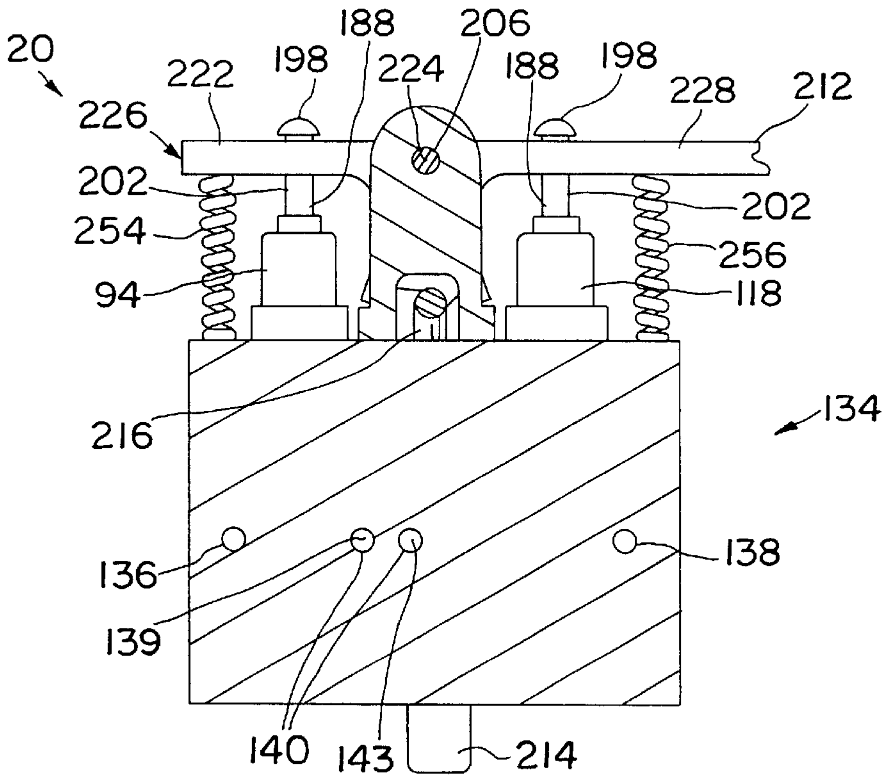
FIG. 10 is a sectional view of the hydraulic controller taken along line 10—10 of FIG. 8 showing a mount for a pivot bar to which the lever arms are pivotally mounted and two internal portions of a distribution manifold formed in the valve housing.

Each solenoid operated valve with manual override 92, 94, 96, 110, 118, 128 includes an inlet 178, an outlet 180 in fluid communication with inlet 178, a valve seat 182 disposed in the fluid communication path between the inlet 178 and outlet 180, a solenoid 184, and a magnetic shaft 186 as shown, for example, in FIG. 9. Magnetic shaft 186 extends through, and is mounted for movement with respect to, solenoid 184 and is responsive to energization of solenoid 184. Each magnetic shaft 186 includes a manual override portion 188 extending externally from solenoid 184 and a plunger end 190 designed to engage valve seat 182 to interrupt fluid communication between inlet 178 and outlet 180. Shaft 186 is biased by a spring 192 (See FIG. 5) in the normally closed position in which plunger end 190 engages valve seat 182 and interrupts the fluid communication between inlet 178 and outlet 180. Manual override portion 188 of shaft 186 includes an upper end 198 having a diameter 200, and a slender shaft 202 extending between plunger end 190 and upper end 198 and having a diameter 204 less than diameter 200 of upper end 198, as shown, for example, in FIG. 9.

Valve housing 134 of hydraulic controller 20 also includes a pivot bar 206 attached to and displaced from valve housing 134, three lever arms 208, 210, 212 pivotally mounted to pivot bar 206, two override solenoids 214 mounted to opposite ends of valve housing 134, and a u-shaped lock bar 216. Lock bar 216 includes two magnetic portions 218 extending through, and moveable with respect to, solenoid 214 between an extended position and a retracted position in response to solenoid 214 energization. Lock bar 216 is biased in the extended position by springs 220. Each lever arm 208, 210, 212 is substantially identical and includes an extension control section 222 extending between pivot point 224 and extension end 226, a retraction control section 228 extending between pivot point 224 and pedal end 230 having a portion substantially parallel to extension control section 222, a pedal 231 attached to pedal end 230, and a lock bar-engaging section 232 extending substantially perpendicular to extension and retraction control sections 222, 228. Lock bar-engaging section includes an arcuate lock bar-engaging surface 234 displaced from and focused about pivot point 224. Extending radially from arcuate surface 234 are first end stop 236, second end stop 238, and extension lock cam 240. Extension lock cam 240 is displaced from center 242 of arcuate surface 234 toward first end stop 236 by a distance 244 substantially equal to radius 246 of lock bar 216, as shown, for example, in FIG. 9.

Lever arm 210, as well as lever arms 208, 212, includes a longitudinally extending extension shaft-receiving slot 248 formed in extension control section 222 and a longitudinally extending retraction shaft-receiving slot 250 formed in retraction control section 228. Each shaft-receiving slot 248, 250 has a width greater than diameter 204 of slender shaft 202 but less than diameter 200 of upper end 198. Each lever arm 208, 210, 212 is biased by spring 254 extending between valve housing 134 and extension control section 222 and spring 256 extending between valve housing 134 and retraction control section 228 to be urged into a neutral position in which extension control section 222 and retraction control section 228 are substantially parallel to top of valve housing 134.

Each lever arm 208, 210, 212 is associated with a particular cylinder 42, 66, 56 and controls the extension and retraction valves associated with that particular cylinder. Lever arm 208 is associated with hilow cylinder 42 so slender shaft 202 of extension valve 92 is received in extension shaft-receiving slot 248 and slender shaft 202 of retraction valve 110 is received in retraction shaft-receiving slot 250 of lever arm 208. Lever arm 210 is associated with head cylinders 56, 56' so slender shaft 202 of extension valve 96 is received in extension shaft-receiving slot 248 and slender shaft 202 of retraction valve 128 is received in retraction shaft-receiving slot 250 of lever arm 210. Lever arm 212 is associated with leg cylinder 66 so slender shaft 202 of extension valve 94 is received in extension shaft-receiving slot 248 and slender shaft 202 of retraction valve 118 is received in retraction shaft-receiving slot 250 of lever arm 212.

When any lever arm 208, 210, 212 is in neutral position, as shown, for example, in FIGS. 6–10 and 13, normally closed extension valves 92, 96, 94 and retraction valves 110, 128, 118 associated with lever arms 208, 210, 212 return to, or remain in, their normally closed positions. Upper end 198 of manual override portion 188 of shaft 186 of extension valve 92, 96, 94 is slightly above top surface 258 of lever arm 208, 210, 212 adjacent to extension shaft-receiving slot 248. Likewise, upper end 198 of manual override portion 188 of shaft 186 of retraction valve 110, 128, 118 is slightly above top surface 258 of lever arm 208, 210, 212 adjacent to retraction shaft-receiving slot 250. Thus when a lever arm 208, 210, 212 is in neutral position each of its associated valves is closed. Also, lock bar 216 engages center 242 of arcuate surface 234 and abuts cam 240, as shown, for example, in FIGS. 6, 7, 10, 12. The portion of arcuate surface 234 immediately adjacent to cam 240 on the side closer to second end stop 238 to both sides of center 242 is the neutral surface 243.

Figure 15:
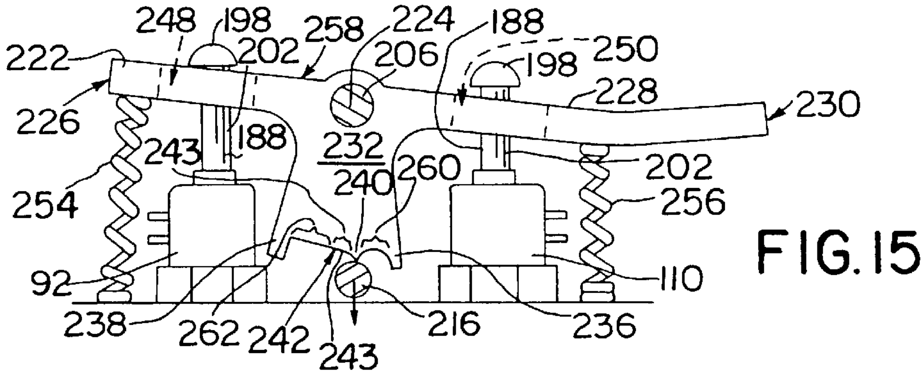
FIG. 15 is a view similar to FIG. 14 showing the pedal end of the lever arm partially depressed so that the lock bar has ridden to the apex of the cam on the arcuate surface.
Figure 16:
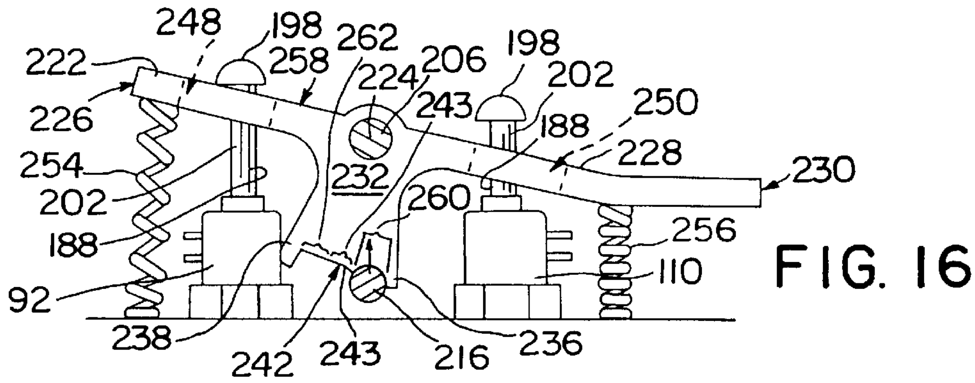
FIG. 16 is a view similar to FIG. 15 with the pedal end of the lever arm fully depressed so that the lock bar has ridden over the cam and fallen into an extension notch defined by the cam, arcuate surface, and first end stop locking the lever arm in an extension position in which the extender solenoid is urged open by manual override and retraction valve is in its normally closed state.

When a pedal 231 of a lever arm 208, 210, 212 is depressed, lever arm 208, 210, 212 pivots about pivot bar 206, lock bar 216 rides over cam 240 compressing springs 220 while passing over cam 240 as shown, for example, in FIG. 15, until lock bar 216 reaches extension portion 260, i.e. between cam 240 and first end stop 236, of arcuate surface 234 allowing springs 220 to again expand as shown, for example, in FIG. 16. Top surface 258 of lever arm 208, 210, 212 adjacent extension shaft-engaging slot 248 pivots upwardly to engage upper end 198 of manual override portion 188 of shaft 186 of extension solenoid 92, 96, 94 to urge shaft 186 upward causing plunger 190 to disengage valve seat 182. Retraction control section 228 pivots downwardly allowing retraction valves 110, 128, 118 to remain in their normally closed states. Springs 220 have greater spring constants than springs 254, 256 so springs 254, 256 cannot force lock bar 216 to again ride over cam 240 and return to neutral position 243, i.e. near center 242 of arcuate surface 234, so lever arm 208, 210, 212 is locked in its depressed state even if caregiver removes pressure from the pedal 231. While lock bar 216 rides over cam 240 of a lever arm 208, 210, 212 which is having its pedal 231 depressed, any previously depressed lever arm 208, 210, 212 which is not also being depressed will return to the neutral position because springs 254, 256 will urge cam 240 to ride over the depressed lock bar 216.

Figure 14:
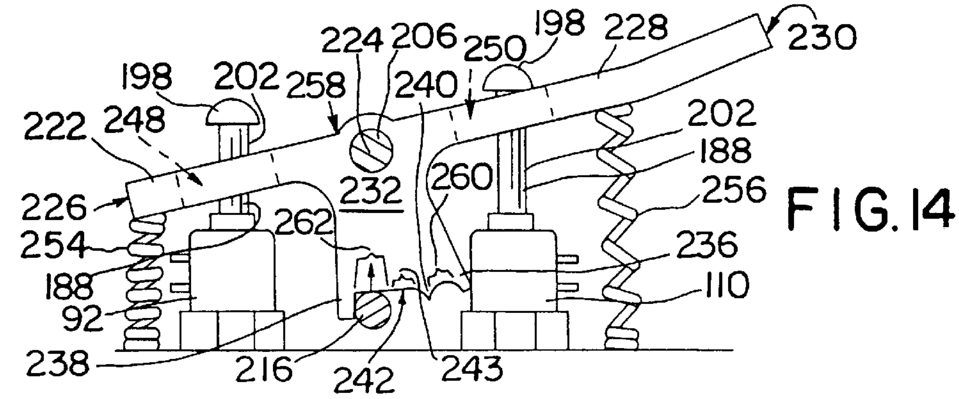
FIG. 14 is a view similar to FIG. 13 showing the lever arm raised to manually open the retraction valve and the lock bar abutting the second end stop in a configuration called the down position.

When a pedal 231 of a lever arm 208, 210, 212 is lifted, extension control section 222 pivots downwardly allowing extension valve 92, 96, 94 to return to, or remain in, its normally closed position, retraction control section 228 pivots upwardly causing top surface 258 of lever arm 208, 210, 212 adjacent to retraction shaft-receiving slot 250 to engage upper end 198 of manual override portion 188 of shaft 186 inducing plunger 190 to disengage from valve seat 182 opening retraction valve 110, 128, 118 as shown, for example, in FIG. 14. Since there is no cam between neutral portion 243 of arcuate surface 234 and second end stop 238, lock bar 216 remains in its extended position and rides along arcuate surface 234 between neutral portion 243 and retraction portion 262. When caregiver ceases lifting pedal 231, springs 254, 256 return lever arm 208, 210, 212 to the neutral position. While the invention is described as having two springs 254, 256 urging each lever arm 208, 210, 212 to the neutral position, this same biasing function could be performed by a single spring extending between housing and lever arm, a torsion bar, or some other position restoring mechanism within the teachings of this invention.

As shown, for example, in FIGS. 1, 2, 3, and 4, lever arms 208, 210, 212 and a pump bar 74 for operation of the hydraulic system 30 of the present invention in a manual mode extend from a cover 71. Pump bar 74 is an actuator for manual pump 102. By pumping on pump bar 74 a caregiver will provide hydraulic pressure to the system 30 generated by manual pump 102. The hydraulic pressure thus provided may be directed by operation of lever arms 208, 210, 212 connected to the slender shaft 202 of manual override portion 188 of magnetic shaft 186 of solenoid operated valves 92, 94, and 96 to the appropriate cylinder 42, 56, 66 as previously stated. Lever arms 208, 210, 212 are used in a manual operation mode as will be shown with respect to the discussion of the hydraulic circuit 30 of the present invention.

Manual overrides of solenoid operated valves 92, 96, and 94 are operated by lever arms 208, 210, 212 which may be actuated by depressing pedal 231 attached to pedal end 230 of lever arms 208, 210, 212 pivotally mounted to valve housing 134 as previously described. Likewise manual overrides 188 of solenoid operated valves 110, 118, 128 are also actuated by lever arms 208, 210, 212. Override portion 188 of shaft 186 of valve 92 which controls extension of hilow cylinder 42 is attached on the opposite side of pivot point 224 of lever arm 208 from override portion 188 of shaft 186 of valve 110 which controls retraction of hilow cylinder 42 as shown, for example, in FIGS. 6, 7. Override portion 188 of shaft 186 of valve 94 which controls extension of leg cylinder 66 is attached on the opposite side of pivot point 224 of lever arm 212 from override portion 188 of shaft 186 of valve 118 which controls retraction of leg cylinder 66 as shown, for example, in FIGS. 6, 7. Override portion 188 of shaft 186 of valve 96 which controls extension of head cylinders 56, 56' is attached on the opposite side of pivot point 224 of lever arm 210 from override portion 188 of shaft 186 of valve 128 which controls retraction of head cylinder 56, 56' as shown, for example, in FIGS. 6, 10.

To manually raise a component of bed 10, a caregiver depresses pedal 231 of lever arm 208, 210, 212 associated with the desired component until it locks in its depressed position which opens extension valve 92, 96, 94 associated with the component and closes retraction valve 110, 128, 118 associated with the component, respectively. The caregiver then repeatedly depresses pump bar 74 allowing pump bar 74 to return to its normal location between depressions to operate manual pump 102. When the desired component reaches the desired level of extension, caregiver ceases depressing pump bar 74. Caregiver may then unlock the lever arm 208, 210, 212 by lifting and releasing pedal 231, or may leave lever arm 208, 210, 212 in its locked state.

To manually lower a component by releasing pressure provided to the system 30, the component's associated lever arm 208, 210, 212 is lifted allowing its associated extension valve 92, 96, and 94 to close or remained closed while forcing its associated retraction valve 110, 128, and 118 open allowing hydraulic pressure to be released from hydraulic system 30 so that the components of bed 10 may be lowered. Releasing lever arm 208, 210, 212 prior to full retraction of the desired component will cause its associated retraction valve 110, 128, 118 to return to its normally closed state causing the desired component to be maintained at its degree of extension at the time of release of lever arm 208, 210, 212. Lever arms 208, 210, 212 control lowering of the hilow function, the head portion, and the foot portion, respectively, by holding open valves 110, 128, 118 respectively only while lever arms 208, 210, 212 are held in the raised position. If lever arms 208, 210, 212 are released, they will spring to a neutral position allowing normally closed valves 110, 128, and 118 respectively to close.

Referring to FIG. 2, bed 10 is shown with a patient 80 occupying the sleep surface which has been raised to the position generally shown in FIG. 1. A headboard 82 and a footboard 84 have been added to bed 10 as would normally be the case in use. Attached to footboard 84 is a control panel 158 used to operate the hydraulic control apparatus in electrical mode. FIG. 3 shows patient 80 having reached the fully flat position from the position shown in FIG. 2.

FIG. 5 shows the hydraulic circuit 30 of the present invention in a standard hydraulic schematic form. Power pack 72 is seen to consist of an electric motor 76 driving a pump 78 which when actuated provides hydraulic fluid through line 89 to line 90. Alternatively, manual pump 102 when actuated provides pressurized hydraulic fluid through line 100 to line 90. Line 90 is connected to pressure inlet 142 of valve housing to be in fluid communication with pressure manifold 136 which splits to feed the inlets 178 of the three extension valves 92, 94 and 96. Each of these valves 92, 94, 96 serve as extension valves which when open allow pressurized hydraulic fluid to flow into hilow cylinder 42, leg cylinder 66, and head cylinders 56, 56' respectively. Each of these valves 92, 94, 96 are normally closed and only allow fluid flow when their solenoid 184 is energized or when valve is actuated by manual override portion 188.

Solenoid valve 92, when open, will allow pressurized hydraulic fluid from pressure manifold 136 to flow through the hilow branch 139 of distribution manifold 140, hilow port 146, and line 147 to hilow cylinder 42 which raises bed 10. Hilow branch 139 of distribution manifold 140 includes pressure branch 98 and return branch 112. The pressurized hydraulic fluid in pressure manifold 136 is supplied from line 90 through pressure inlet 142. The pressurized hydraulic fluid in line 90 may be provided through line 89 extending from electric pump 78 or line 100 extending from manual pump 102. Thus, hilow cylinder 42 is able to receive hydraulic fluid pressurized by either electric pump 78 or manual pump 102 through valve 92.

Line 89 extending from electric pump 78 and line 100 extending from manual pump 102 merge to form line 90 as shown schematically, for example, in FIG. 5. Line 89 is formed to include a check valve 88. Line 100 is also formed to include a check valve 108. When electric pump is operated the pressurized hydraulic fluid opens check valve 88 and closes check valve 108 to prevent back flow through manual pump 102. When manual pump 102 is operated check valve 108 is opened and check valve 88 is forced shut to prevent back flow through electric pump 78. If one of extension valves 92, 94, 96 remains open after either pump 78, 102 ceases operation (as often occurs during manual operation), check valves 108 and 88 are closed by back pressure of hydraulic fluid in line 90.

Both foot pump 102 and power pack 72 draw hydraulic fluid from hydraulic reservoir 70. Reservoir 70 serves as a source for the hydraulic fluid to the entire system 30. Before the hydraulic fluid enters power pack 72 or foot pump 102, it passes from reservoir 70 through line 103, filter 104, and line 105. There is a separate branch line 106 which connects line 105 to foot pump 102.

Returning now to hydraulic hilow cylinder 42, hilow cylinder 42 is of the single acting type. That is its rod 44 is extended by supplying pressurized hydraulic fluid through line 147 to hilow cylinder 42. If solenoid valve 92 is then closed, pressure will be trapped in line 147 and pressure branch 98 of hilow branch 139 of distribution manifold 140 and rod 44 will remain extended. To retract rod 44, solenoid valve 110 is actuated to allow fluid to flow back along line 147 through hilow port 146 then through release branch 112 of hilow branch 139 of distribution manifold 140 into solenoid valve 110, from whence the fluid exits through return manifold 138, return outlet 144, and return line 114 to return to reservoir 70. With pressure trapped in line 147, pressure branch 98 and release branch 112 of hilow branch 139 of distribution manifold 140, and solenoid valves 92 and 110 both closed, rod 44 will stay in the position where it was placed. If valve 92 has been manually actuated by lever arm 208, it will typically remain open until closed as previously described. In the case of manual actuation of valve 92, check valves 88, 108 prevent fluid from returning to reservoir 70 through either electric pump 78 or manual pump 102.

When solenoid valve 110 is actuated, either manually or electrically, rod 44 will slowly retract as a result of the weight on it, and thus bring cantilevered arm 26 downward and retract entire bed 10 toward the floor. When rod 44 has reached the desired extended position releasing lever arm 208 or de-energizing solenoid 184 causes valve 110 to close leaving line 147 pressurized. In order to relieve the pressure, lever arm 208 may be raised, or solenoid 184 energized, to actuate valve 110 and allow hydraulic fluid to return to reservoir 70.

The operation of all of cylinders 42, 56, and 66 are substantially identical to the operation thus described. Solenoid valves 92, 94 and 96 are all identical and may be electrically operated from control panel 158 located on the bed 10, either in the siderail or at the foot 11 of bed 10, as shown, for example in FIG. 4. Pump outlet line 90 provides pressurized hydraulic fluid to pressure manifold 136 which is also connected to inlet 178 of the normally closed solenoid valve 94. Pressure portion 116 of leg portion 141 of distribution manifold 140 is in fluid communication with outlet 180 of normally closed solenoid valve 94. Leg portion 141 is connected through leg port 150 and line 151 to leg cylinder 66 which operates thigh and leg portions 62, 64 of articulating deck 39. In the electrically operated mode, pressure from pump 78 will flow through line 89, line 90, pressure inlet 142, pressure manifold 136, and, if solenoid valve 94 is actuated to its open position, then through pressure branch 116 of leg branch 141 of distribution manifold 140, leg port 150, and line 151 operate leg cylinder 66 and extend rod 68. This then will move thigh portion 62 and leg portion 64 to the upright position shown in FIG. 1. When solenoid valve 94 is closed, pressure will remain in line 151 and rod 68 will remain in the position where it was placed.

In order to retract rod 68 and allow thigh portion 62 and leg portion 64 to return to their flat position, a normally closed solenoid valve 118 is opened. Inlet 178 of solenoid valve 118 is connected to a release branch 120 of leg branch 141 of distribution manifold 140 which is in fluid communication through leg port 150 with line 151 coupled to leg cylinders 66. Outlet 180 of solenoid valve 118 is then connected to reservoir 70 through release manifold 188, return outlet 144, and return line 114. Thus, actuation of the solenoid valve 118 by energizing its solenoid 184 will allow the pressurized hydraulic fluid extending leg cylinder 66 to be released by returning the hydraulic fluid to reservoir 70 through line 151, leg port, 150, leg portion 141 of distribution manifold 140, return manifold 138, return outlet 144, and return line 114. This will allow rod 68 to retract.

During manual mode of operation of leg cylinder 66, lever arm 212 and manual pump 102 are operated in a manner similar to that previously described with respect to the hilow cylinder 42. Lever arm 212 is depressed causing manual overrides 188 to close valve 118 and open valve 94. Operation of foot powered pump 102 by pump bar 74 generates pressurized hydraulic fluid which will flow from reservoir 70 through pump lines 103, 105, and 106 to 102, then through line 89 and 90, pressure inlet 142, pressure manifold

136, valve 94, pressure branch 116 of leg branch 141 of distribution manifold 140, leg port 150, and line 151 to extend rod 68 of leg cylinder 66. Ceasing operation of foot pump 102 will cause the pressurized fluid to remain in cylinder 66 and lines 151 maintaining rod 68 in the position which it was in at the time operation was ceased. Raising pedal 231 of lever arm 212 will cause manual overrides 188 to close valve 94 and open valve 118. Pressurized fluid will then return from cylinder 66 through line 151, leg port 150, return branch 120 of leg branch 141 of manifold 140, valve 118, return manifold 138, return outlet 144, and line 114 to reservoir 70 allowing rod 68 to retract. If lever arm 212 is released at any time during retraction of arm 68, valve 118 will close and arm 68 will remain extended to the extent that it was extended at release of lever arm 212.

FIG. 1 showed only one head cylinder 56 operating head portion 52, the actual configuration of two cylinders is shown in FIG. 5. These cylinders are designated as 56 and 56'. Head cylinders 56 and 56' are both operated simultaneously through solenoid valves 96 and 128. Inlet 178 of solenoid valve 96 is connected through pressure manifold 136, pressure inlet 142, line 90, and line 89 to power pack 72. Solenoid valve 96 is a normally closed valve and its actuation will allow pressurized operating fluid to simultaneously flow to both head cylinders 56 and 56' through pressure branch 124 of head branch 143 of manifold 140, head port 148, line 149 and branch connectors 125 and 126. Actuation of head cylinders 56 and 56' will cause their respective rods 58 and 58' to be extended and raise the head portion 52 as seen in FIG. 1. Pressurized hydraulic fluid is trapped in lines 149, 125 and 126 by closing solenoid valve 96 after the pressurized fluid has been furnished and rods 58 and 58' have been extended.

To release the pressure on head cylinders 56 and 56', solenoid valve 128 which is normally closed is opened. This then allows the operating fluid in head cylinders 56 and 56' to flow through branch lines 125, 126, line 149, leg port 118, and return branch 130 of head branch 143 of distribution manifold 140 to solenoid valve 128. When solenoid valve 128 is opened, the operating fluid will then flow through return manifold 138, return port 144, and line 114 to reservoir 70.

Solenoid valves with manual overrides 94, 96, 118, 128, all serve as a first hydraulic control valve means to control functioning of head portion 52, thigh portion 62, leg portion 64 and their associated operating hydraulic cylinders. Solenoid valves with manual overrides 98 and 110 serve as a second hydraulic control valve means to control the hilow function of bed 10 and hilow cylinder 42.

Solenoid valves 118 and 128 are fixed to allow a certain flow of hydraulic fluid through them when they are actuated. This flow is calculated to allow a relatively gradual lowering of the portions which they control. This avoids unnecessary jarring and uncomfortable feelings on the part of the patient.

FIG. 4 shows footboard 84 of the type usually used with the bed 10. Footboard 84 is attached to foot end 11 of bed 10. A bed control panel 158 is hooked to footboard 84. While illustrated control panel 158 is shown hooked to footboard 84, it is to be understood that it may be incorporated into a housing in footboard 84, attached to or incorporated into headboard 82 or a side rail, or remain unattached to bed 10. Control panel 158 carries a number of electrical switches which control various functions. The illustrated control panel 158 includes a head up switch 160, a head down switch 162, a leg up switch 164, a leg down switch 166, a hilow up switch 168, and a hilow down switch 170.

Each switch is normally open and is electrically connected to not only the valve housing 134 but also to the solenoids 214 controlling the lock bar 216. Upon actuation of any of the switches 160, 162, 164, 166, 168, 170, a circuit is closed to energize solenoids 214 inducing retraction of lock bar 216. With lock bar 216, retracted lever arms 208, 210, 212 return to the neutral position allowing the normally closed valves 92, 96, 94, 110, 128, 118 to close or remain closed. This removes any valve settings which may had been manually entered previously through actuation of lever arms 208, 210, 212. Head up switch 160 turns on power pack 72 and opens valve 96 by energizing its solenoid 184. This causes head portion 52 to be raised by the action of cylinders 56 and 56'. Head down switch 162 is electrically connected to solenoid 184 of head retraction valve 128 and lock bar solenoids 214. Actuation of head down switch 162 will open valve 128 by energizing its solenoid 184 allowing hydraulic fluid to return to reservoir 70 and head portion 52 to drop.

Leg up switch 164 will turn on power pack 72 and open valve 94 by energizing its solenoid 184. This will cause leg cylinder 66 to operate and raise thigh portion 62 and leg portion 64. Conversely operation of a leg down switch 166 will open valve 118 by energizing its solenoid 184, causing hydraulic fluid to return to reservoir 70 and thigh portion 62 and leg portion 64 to return to their horizontal position.

When hilow up switch 168 is operated, power pack 72 will operate and valve 92 will be opened by its energized solenoid 184. This will cause hilow cylinder 42 to operate and raise bed 10. To lower bed 10, a hilow down switch 170 is activated. This will cause valve 110 to open in response to its energized solenoid 184 and allow hydraulic fluid to return to reservoir 70 through valve 110.

Operation of any of the switches 160, 162, 164, 166, 168, or 170 will initially actuate solenoids 24 which will retract lock bar 216 causing all spring loaded lever arms 208, 210, 212 to return to their neutral positions allowing all valves 92, 94, 96, 110, 118, and 128 to return to their normally closed positions unless the solenoid 184 of that particular valve is currently being energized.

While hydraulic control apparatus 20 has been described as having three lever arms 208, 210, 212 each associated with a two port two position (2×2) extension valve 92, 96, 94 and a 2×2 port two position retraction valve 110, 128, 118, it is within the teaching of the invention to have a single three port three position (3×3) normally closed solenoid actuated valve with manual override attached to each lever arm for controlling the extension and retraction of its associated component. It is also within the teaching of the invention to have less than three or more than three hydraulic components controlled by the apparatus by adding or subtracting the appropriate number of extension valves, retraction valves, lever arms, up buttons and down buttons.

The hydraulic control apparatus 20 need not be an original component supplied with a bed but may be used to upgrade beds with hydraulic systems 30 which do not currently provide both manual and electrical control of the hydraulic system 30.

It is also envisioned that in the event of power pack 72 failure, pump bar 74 could be manipulated while one of the up switches 160, 164, 168 is actuated to supply pressurized hydraulic fluid with manual pump 102 through an electrically actuated extension valve 96, 94, 92 to a hydraulic cylinder 56, 66, 42. In the unlikely event of failure of solenoids 184 of extension valves 96, 94, 92, lever arms 212, 210, 208 could be depressed while up switches 160, 164, 168 are actuated so that pressurized hydraulic fluid generated by electric pump 76 can be supplied to a hydraulic cylinder 56, 66, 42 through a manually actuated valve 96, 94, 92.

Although the invention has been described in detail with reference to a certain illustrated embodiment, variations and modifications exist within the scope and spirit of the invention as described and defined in the following claims.

What is claimed is:

1. A valve block comprising:

a fluid supply path, a fluid return path, a valve assembly including a supply member positionable between a supply interruption position in which the supply member interrupts the fluid supply path and a supply position in which the supply member permits fluid flow through the fluid supply path and a return member positionable between a return interruption position in which the return member interrupts the fluid return path and a return position in which the return member permits fluid flow through the fluid return path, a multi-state manual actuator operably connected to the supply member and the return member, the manually operated valve actuator being movable between a supply state in which the supply member is in the supply position and the return member is in the return interruption position, a return state in which the return member is in the return position and the supply member is in the supply interruption position, and a neutral state wherein the supply member and the return member are free to assume any position, an electrical actuator operably connected to the supply member to selectively position the supply member between the supply interruption position and the supply position and operably connected to the return member to selectively position the return member between the return interruption position and the return position, a controller configured to generate an override signal when the electrically operated actuator is actuated, and a manual actuator override configured to place the multi-state manual actuator in the neutral state when the override signal is generated.

2. The valve block of claim 1, wherein the multi-state manual actuator includes a spring element to bias the multi-state manual actuator into the neutral state, a supply catch to lock the multi-state manual actuator in the supply state, and a return catch to lock the multi-state manual actuator in the return state.

3. The valve block of claim 2, wherein the override includes a catch engager and a catch engager actuator to position the catch engager between a catch-engaged state and a catch-disengaged state, the catch engager being configured to engage one of the supply catch and the return catch when the catch engager actuator is in the catch-engaged state.

4. The valve block of claim 3, wherein the catch engager actuator includes an arm, the arm being biased to engage one of the supply catch and the return catch and a solenoid electromagnetically coupled to the arm to disengage the arm from one of the supply catch and the return catch when the solenoid is energized.

5. A valve block comprising:

a fluid supply path, a fluid return path, a valve assembly including a supply member positionable between a supply interruption position in which the supply member interrupts the fluid supply path and a supply position in which the supply member does not interrupt the fluid supply path and a return member positionable between a return interruption position in which the return member interrupts the fluid return path and a return position in which the return member does not interrupt the fluid return path, a multi-state manual actuator operably connected to the supply member and the return member, the manually operated valve actuator being designed and arranged to assume a supply state in which the supply member is in the supply position and the return member is in the return interruption position, a return state in which the return member is in the return position and the supply member is in the supply interruption position, and a neutral state wherein the supply member and the return member are free to assume any position, an electrical actuator operably connected to the supply member to selectively position the supply member between the supply interruption position and the supply position and operably connected to the return member to selectively position the return member between the return interruption position and the return position, a controller for generating an override signal, and a manual actuator override designed and arranged to place the multi-state manual actuator in the neutral state when an override signal is generated, wherein the controller generates the override signal when the electrically operated actuator is actuated.

6. The valve block of claim 5 wherein the valve assembly includes a supply valve and a spaced apart return valve.

7. The valve block of claim 5 wherein the supply member includes a supply-opened engagement point and the return member includes a return-opened engagement point and the multi-state manual actuator includes an arm wherein the arm engages the supply-opened engagement point and does not engage the return-opened engagement point when the multi-state manual actuator is in the supply state, the arm engages the return-opened engagement point and does not engage the supply-opened engagement point when the multi-state manual actuator is in the return state, and the arm does not engage either the supply-opened or return-opened engagement points when in the neutral position.

8. The valve block of claim 5, wherein the valve assembly includes a supply valve and a spaced apart return valve.

9. The valve block of claim 8 and further comprising a housing having a mounting surface, a fulcrum having a first side and a second side mounted to the mounting surface, wherein the arm is pivotally mounted to the fulcrum and the supply valve is mounted to the mounting surface on the first side of the fulcrum and the return valve is mounted to the mounting surface on the second side of the fulcrum.

10. The valve block of claim 5, wherein the multi-state manual actuator includes a spring element to bias the multi-state manual actuator in the neutral state, a supply catch to lock the multi-state manual actuator in the supply state, and a return catch to lock the multi-state manual actuator in the return state.

11. The valve block of claim 10, wherein the override includes a catch engager and a catch engager actuator to position the catch engager between a catch-engaged state and a catch-disengaged state, the catch engager being designed and arranged to engage one of the supply catch and the return catch when the catch engager actuator is in the catch-engaged state.

12. The valve block of claim 11, wherein the catch engager actuator includes an arm, the arm being biased to engage one of the supply catch and the return catch and a solenoid electromagnetically coupled to the arm to disengage the arm from one of the supply catch and the return catch when the solenoid is energized.

13. The valve block of claim 12 wherein the override signal causes the solenoid to be energized.

* * * * *

UNITED STATES PATENT AND TRADEMARK OFFICE

CERTIFICATE OF CORRECTION

PATENT NO. : 6,352,240 B1
DATED : March 5, 2002
INVENTOR(S) : Gerald D. Eckstein, David W. Hornbach and Jeffrey A. Moster It is certified that error appears in the above-identified patent and that said Letters Patent is hereby corrected as shown below:

Title page,
Item [56], References Cited, U.S. PATENT DOCUMENTS, please add:

| | | |
|---|---|---|
| -- 3,765,644 | 10/1973 | Zeuner |
| 4,207,917 | 6/1980 | Opel et al. -- |

Item [56], References Cited, FOREIGN PATENT DOCUMENTS, please add:

| | | |
|---|---|---|
| -- 2 475 180 | 8/1981 | FR |
| 3127913 | 1/1983 | DE |
| 0 893 609 | 1/1999 | EP |
| 0 896 178 | 2/1999 | EP -- |

Signed and Sealed this

Twenty-sixth Day of November, 2002

*Attest:*

JAMES E. ROGAN

*Attesting Officer*

*Director of the United States Patent and Trademark Office*